US008655537B2

(12) United States Patent  
Ferguson et al.

(10) Patent No.: US 8,655,537 B2  
(45) Date of Patent: *Feb. 18, 2014

(54) MODIFYING BEHAVIOR OF AUTONOMOUS VEHICLE BASED ON PREDICTED BEHAVIOR OF OTHER VEHICLES

(71) Applicant: Google Inc., Mountain View, CA (US)

(72) Inventors: David Ian Franklin Ferguson, San Francisco, CA (US); Dmitri A. Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,784

(22) Filed: May 23, 2013

(65) Prior Publication Data

US 2013/0261872 A1 Oct. 3, 2013

Related U.S. Application Data

(63) Continuation of application No. 13/420,820, filed on Mar. 15, 2012, now Pat. No. 8,457,827.

(51) Int. Cl.
*G01C 22/00* (2006.01)
*G05D 1/00* (2006.01)

(52) U.S. Cl.
USPC .......................................................... 701/23

(58) Field of Classification Search
USPC .......................................................... 701/23
See application file for complete search history.

(56) References Cited

U.S. PATENT DOCUMENTS

| 5,410,477 | A | 4/1995 | Ishii et al. |
| 6,782,961 | B1 * | 8/2004 | Ishikawa et al. ............... 180/197 |
| 6,805,216 | B2 | 10/2004 | Noecker |
| 6,944,543 | B2 | 9/2005 | Prakah-Asante et al. |
| 8,457,827 | B1 | 6/2013 | Ferguson et al. |

(Continued)

FOREIGN PATENT DOCUMENTS

JP 2008-276285 A 11/2008

OTHER PUBLICATIONS

International Search Report and Written Opinion, mailed Jun. 2, 2013, from International Application No. PCT/US2013/025592.

*Primary Examiner* — Mary Cheung  
*Assistant Examiner* — Frederick Brushaber  
(74) *Attorney, Agent, or Firm* — McDonnell Boehnen Hulbert & Berghoff LLP

(57) ABSTRACT

A vehicle configured to operate in an autonomous mode could determine a current state of the vehicle and the current state of the environment of the vehicle. The environment of the vehicle includes at least one other vehicle. A predicted behavior of the at least one other vehicle could be determined based on the current state of the vehicle and the current state of the environment of the vehicle. A confidence level could also be determined based on the predicted behavior, the current state of the vehicle, and the current state of the environment of the vehicle. In some embodiments, the confidence level may be related to the likelihood of the at least one other vehicle to perform the predicted behavior. The vehicle in the autonomous mode could be controlled based on the predicted behavior, the confidence level, and the current state of the vehicle and its environment.

20 Claims, 7 Drawing Sheets

(56) References Cited

U.S. PATENT DOCUMENTS

| | | | |
|---|---|---|---|
| 2009/0067675 A1* | 3/2009 | Tan et al. | 382/104 |
| 2009/0088916 A1 | 4/2009 | Elgersma et al. | |
| 2010/0010699 A1* | 1/2010 | Taguchi et al. | 701/23 |
| 2010/0042282 A1* | 2/2010 | Taguchi et al. | 701/25 |
| 2010/0106356 A1 | 4/2010 | Trepagnier et al. | |
| 2010/0164789 A1* | 7/2010 | Basnayake | 342/357.04 |
| 2010/0228427 A1 | 9/2010 | Anderson et al. | |
| 2011/0184605 A1 | 7/2011 | Neff | |
| 2011/0231061 A1 | 9/2011 | Reeve et al. | |

* cited by examiner

MODIFYING BEHAVIOR OF AUTONOMOUS VEHICLE BASED ON PREDICTED BEHAVIOR OF OTHER VEHICLES

CROSS REFERENCE TO RELATED APPLICATION

This present application is a continuation of U.S. patent application Ser. No. 13/420,820, filed on Mar. 15, 2012, and entitled "Modifying Behavior of Autonomous Vehicle Based on Predicted Behavior of Other Vehicles," which is herein incorporated by reference as if fully set forth in this description.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In a first aspect, a method is provided. The method includes determining, using a computer system, a current state of a vehicle. The vehicle is configured to operate in an autonomous mode. The method also includes determining, using the computer system, a current state of an environment of the vehicle. The environment of the vehicle includes at least one other vehicle. The method additionally includes determining, using the computer system, a predicted behavior of the at least one other vehicle based on at least the current state of the vehicle and the current state of the environment of the vehicle. The method further includes determining, using the computer system, a confidence level. The confidence level includes a likelihood of the at least one other vehicle to perform the predicted behavior. The confidence level is based on at least the predicted behavior, the current state of the vehicle, and the current state of the environment of the vehicle. The method yet further includes controlling, using the computer system, the vehicle in the autonomous mode based on the predicted behavior, the confidence level, the current state of the vehicle, and the current state of the environment of the vehicle.

In a second aspect, a vehicle is provided. The vehicle includes at least one sensor. The at least one sensor is configured to acquire vehicle state information and environment state information. The vehicle state information includes information about a current state of the vehicle. The environment state information includes information about a current state of an environment of the vehicle, and the environment of the vehicle includes at least one other vehicle. The vehicle also includes a computer system. The computer system is configured to determine the current state of the vehicle based on the vehicle state information. The computer system is further configured to determine the current state of the environment of the vehicle based on the environment state information. The computer system is also configured to determine a predicted behavior of the at least one other vehicle based on at least the current state of the vehicle and the current state of the environment of the vehicle. The computer system is additionally configured to determine a confidence level. The confidence level includes a likelihood of the at least one other vehicle to perform the predicted behavior. The confidence level is based on at least the predicted behavior, the current state of the vehicle, and the current state of the environment of the vehicle. The computer system is also configured to control the vehicle in the autonomous mode based on the predicted behavior, the confidence level, the current state of the vehicle, and the current state of the environment of the vehicle.

In a third aspect, a non-transitory computer readable medium having stored instructions is provided. The instructions are executable by a computer system to cause the computer system to perform functions. The functions include determining a current state of a vehicle. The vehicle is configured to operate in an autonomous mode. The functions also include determining a current state of an environment of the vehicle. The environment of the vehicle includes at least one other vehicle. The functions additionally include determining a predicted behavior of the at least other vehicle based on at least the current state of the vehicle and the current state of the environment of the vehicle. The functions further include determining a confidence level. The confidence level includes a likelihood of the at least one other vehicle to perform the predicted behavior, the current state of the vehicle, and the current state of the environment of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
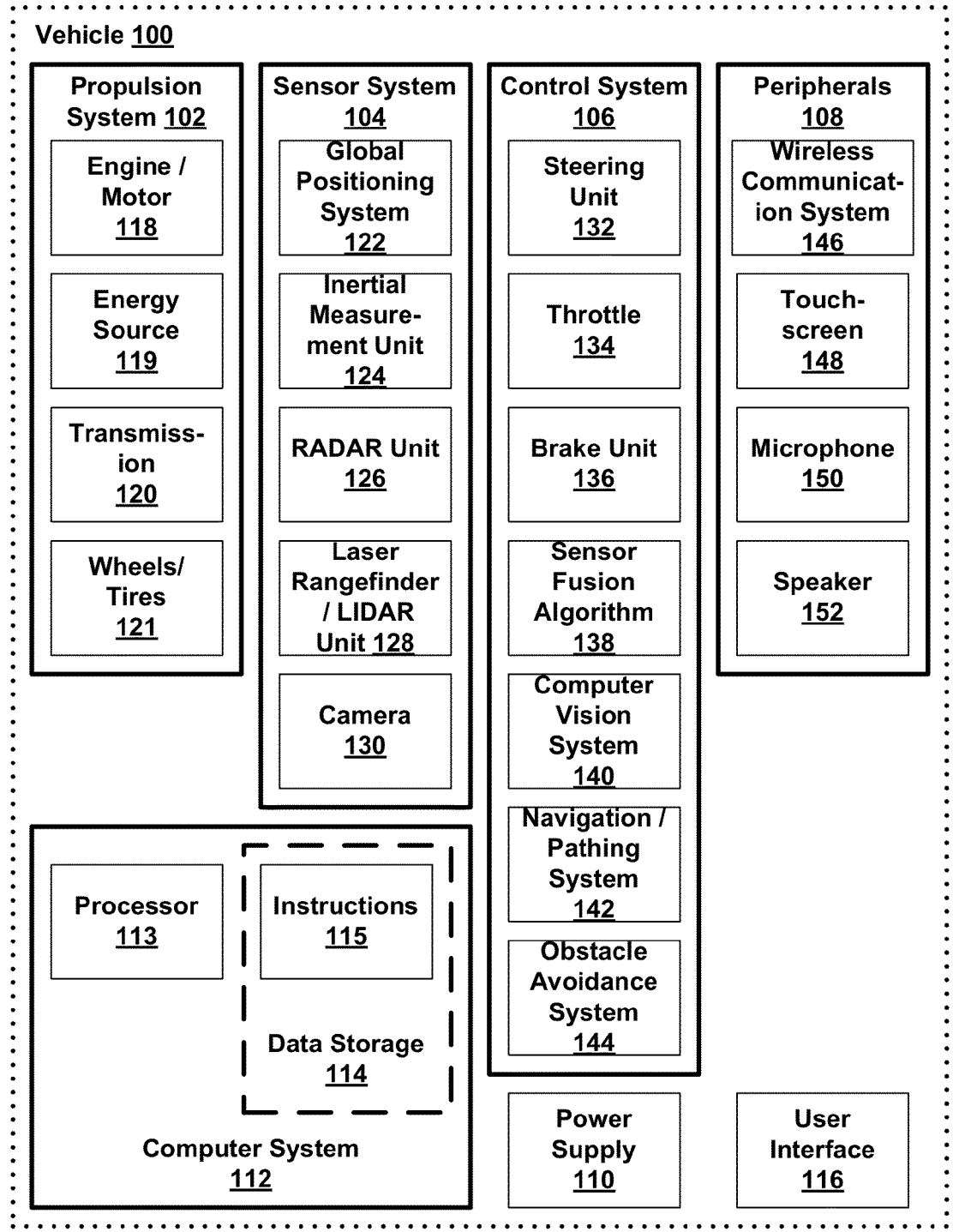
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to determining a current state of a vehicle, determining a current state of an environment of the vehicle, determining a predicted behavior of at least one other vehicle in the environment of the vehicle, determining a confidence level that relates to a likelihood of the at least one other vehicle to perform the predicted behavior, and controlling the vehicle operating in an autonomous mode based on the determined information.

Within the context of the disclosure, the vehicle could be operable in various modes of operation. Depending on the embodiment, such modes of operation could include manual, semi-autonomous, and autonomous modes. In the autonomous mode, the vehicle could be driven with little or no user interaction. In the manual and semi-autonomous modes, the vehicle could be driven entirely and partially, respectively, by a user.

Some methods disclosed herein could be carried out in part or in full by a vehicle configured to operate in an autonomous mode with or without external interaction (e.g., such as from a user of the vehicle). In one such example, a vehicle could determine a current state of the vehicle. For instance, the vehicle may acquire data about various propulsion, sensor, and control systems of the vehicle (e.g., revolutions per minute, vehicle speed, current driving lane, fuel level, brake fluid level, etc.). The vehicle could determine a current state of an environment of the vehicle. Within the context of the disclosure, the environment of the vehicle includes at least one other vehicle. The determination of the current state of the environment of the vehicle could be made based on information regarding external driving conditions (e.g., ice on the roadway), other vehicle speed, and other vehicle location, among other factors. The vehicle could determine a predicted behavior of the at least one other vehicle based on at least the current state of the vehicle and the current state of the environment of the vehicle. The method could also include determining a confidence level that may represent a likelihood of the at least one other vehicle to perform the predicted behavior. The determination of the confidence level could be based on the predicted behavior, the current state of the vehicle, and the current state of the environment of the vehicle. Based on the determined information, the vehicle could be controlled in the autonomous mode.

Other methods disclosed herein could be carried out in part or in full by a server. In example embodiment, a server may receive sensor data from a vehicle operating in an autonomous mode, such as a plurality of images captured using a camera. The sensor data could be used by the server to determine one or more predicted behaviors of vehicles in a local environment of the vehicle. The server may additionally or alternatively determine one or more confidence levels that could be related to one or more likelihoods that the respective vehicles will perform the given predicted behaviors. Further, the server could remotely control the vehicle in the autonomous mode by providing, for instance, instructions to adjust various aspects of the control system (throttle, brake unit, steering unit). Other interactions between a vehicle operating in an autonomous mode and a server are possible within the context of the disclosure.

A vehicle is also described in the present disclosure. The vehicle may include elements such as at least one sensor and a computer system. The at least one sensor could be configured to acquire vehicle state information (information about the vehicle itself) and environment state information (information about the environment of the vehicle). The computer system could be configured to perform various functions based in full or in part on the acquired information. The functions could include determining the current state of the vehicle as well as determining the current state of an environment of the vehicle. The functions could further include determining a predicted behavior of at least one other vehicle in the environment of the vehicle and a corresponding confidence level that could represent a likelihood of the at least one other vehicle to perform the predicted behavior. The computer system of the vehicle could also be configured to control the vehicle in an autonomous mode based on the predicted behavior, the confidence level, and the current state of the vehicle and its environment.

Also disclosed herein are non-transitory computer readable media with stored instructions. The instructions could be executable by a computing device to cause the computing device to perform functions similar to those described in the aforementioned methods.

There are many different specific methods and systems that could be used in determining a current state of a vehicle, determining a current state of an environment of the vehicle, determining a predicted behavior of at least one other vehicle in the environment, determining a confidence level that corresponds to the likelihood of the at least one other vehicle to perform the predicted behavior, and controlling the vehicle in the autonomous mode based on the determined information. Each of these specific methods and systems are contemplated herein, and several example embodiments are described below.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, the vehicle 100 could control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be a still camera or a video camera.

The control system 106 may be configured to control operation of the vehicle 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include another vehicle. The computer vision system 140 could recognize the other vehicle as such based on object recognition models stored in data storage 114.

The computer system 112 could carry out several determinations based on the information. For example, the computer system 112 could determine one or more predicted behaviors of the other vehicle. The predicted behavior could be based on several factors including the current state of the vehicle 100 (e.g., vehicle speed, current lane, etc.) and the current state of the environment of the vehicle 100 (e.g., speed limit, number of available lanes, position and relative motion of other vehicles, etc.).

For instance, in a first scenario, if another vehicle is rapidly overtaking the vehicle 100 from a left-hand lane, while vehicle 100 is in a center lane, one predicted behavior could be that the other vehicle will continue to overtake the vehicle 100 from the left-hand lane.

In a second scenario, if the other vehicle is overtaking vehicle 100 in the left-hand lane, but a third vehicle traveling ahead of vehicle 100 is impeding further progress in the left-hand lane, a predicted behavior could be that the other vehicle may cut in front of vehicle 100.

The computer system 112 could further determine a confidence level corresponding to each predicted behavior. For instance, in the first scenario, if the left-hand lane is open for the other vehicle to proceed, the computer system 112 could determine that it is highly likely that the other vehicle will continue to overtake vehicle 100 and remain in the left-hand lane. Thus, the confidence level corresponding to the first predicted behavior (that the other vehicle will maintain its lane and continue to overtake) could be high, such as 90%.

In the second scenario, where the other vehicle is blocked by a third vehicle, the computer system 112 could determine that there is a 50% chance that the other vehicle may cut in front of vehicle 100 since the other vehicle could simply slow and stay in the left-hand lane behind the third vehicle. Accordingly, the computer system 112 could assign a 50% confidence level (or another signifier) to the second predicted behavior in which the other vehicle may cut in front of the vehicle 100.

In the example embodiment, the computer system 112 could work with data storage 114 and other systems in order to control the control system 106 based on at least on the predicted behavior, the confidence level, the current state of the vehicle 100, and the current state of the environment of the vehicle 100. In the first scenario, the computer system 112 may elect to adjust nothing as the likelihood (confidence level) of the other vehicle staying in its own lane is high. In the second scenario, the computer system 112 may elect to control vehicle 100 to slow down slightly (by reducing throttle 134) or to shift slightly to the right (by controlling steering unit 132) within the current lane in order to avoid a potential collision. Other examples of interconnection between the components of vehicle 100 are numerous and possible within the context of the disclosure.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
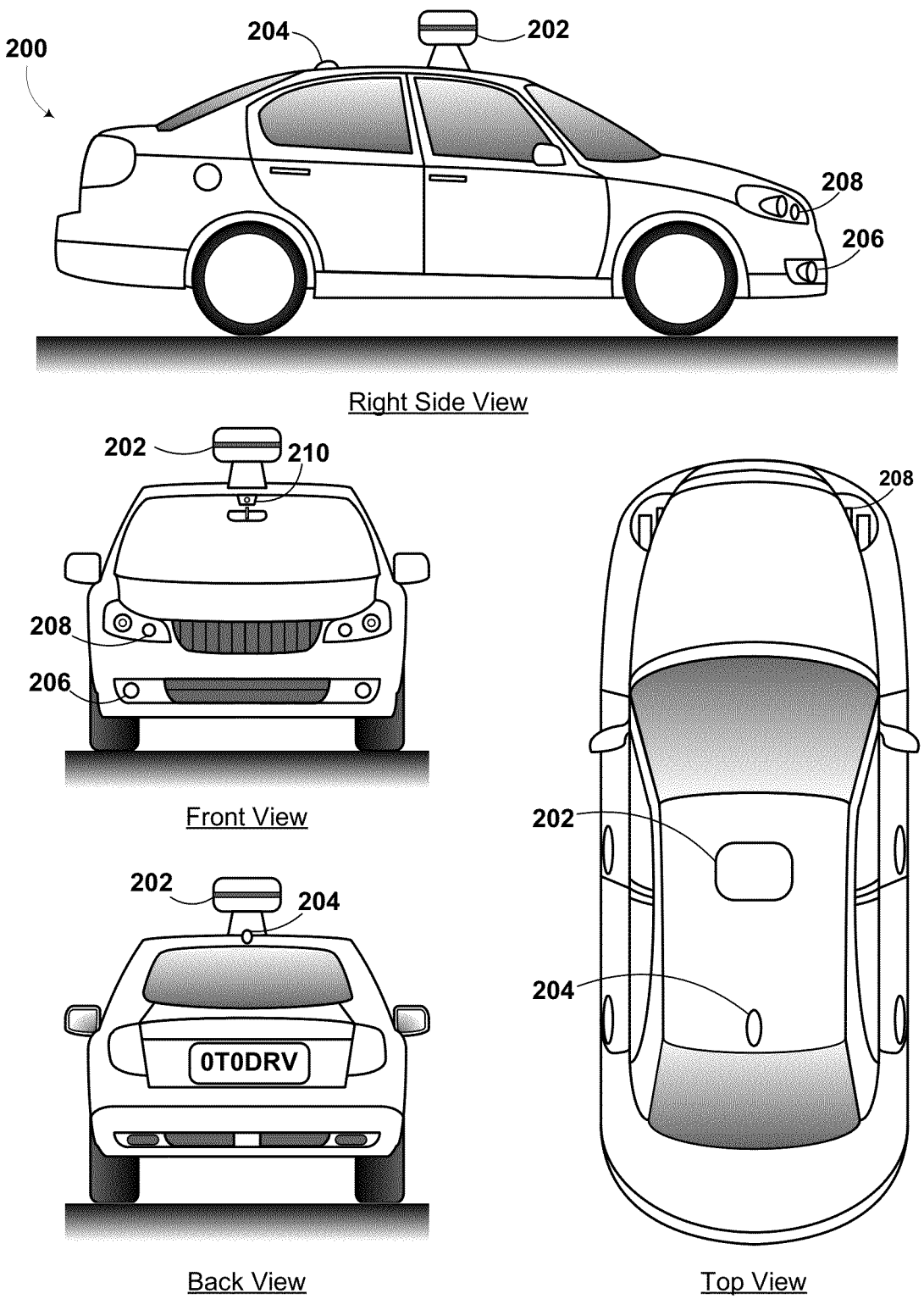
FIG. 2 shows a vehicle, according to an example embodiment.

FIG. 2 shows a vehicle 200 that could be similar or identical to vehicle 100 described in reference to FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

Depending on the embodiment, vehicle 200 could include a sensor unit 202, a wireless communication system 204, a LIDAR unit 206, a laser rangefinder unit 208, and a camera 210. The elements of vehicle 200 could include some or all of the elements described for FIG. 1.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light, or x-rays. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object. As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 could have associated optics that could be operable to provide an adjustable field of view. Further, the camera 210 could be mounted to vehicle 200 with a movable mount that could be operable to vary a pointing angle of the camera 210.

Figure 3A:
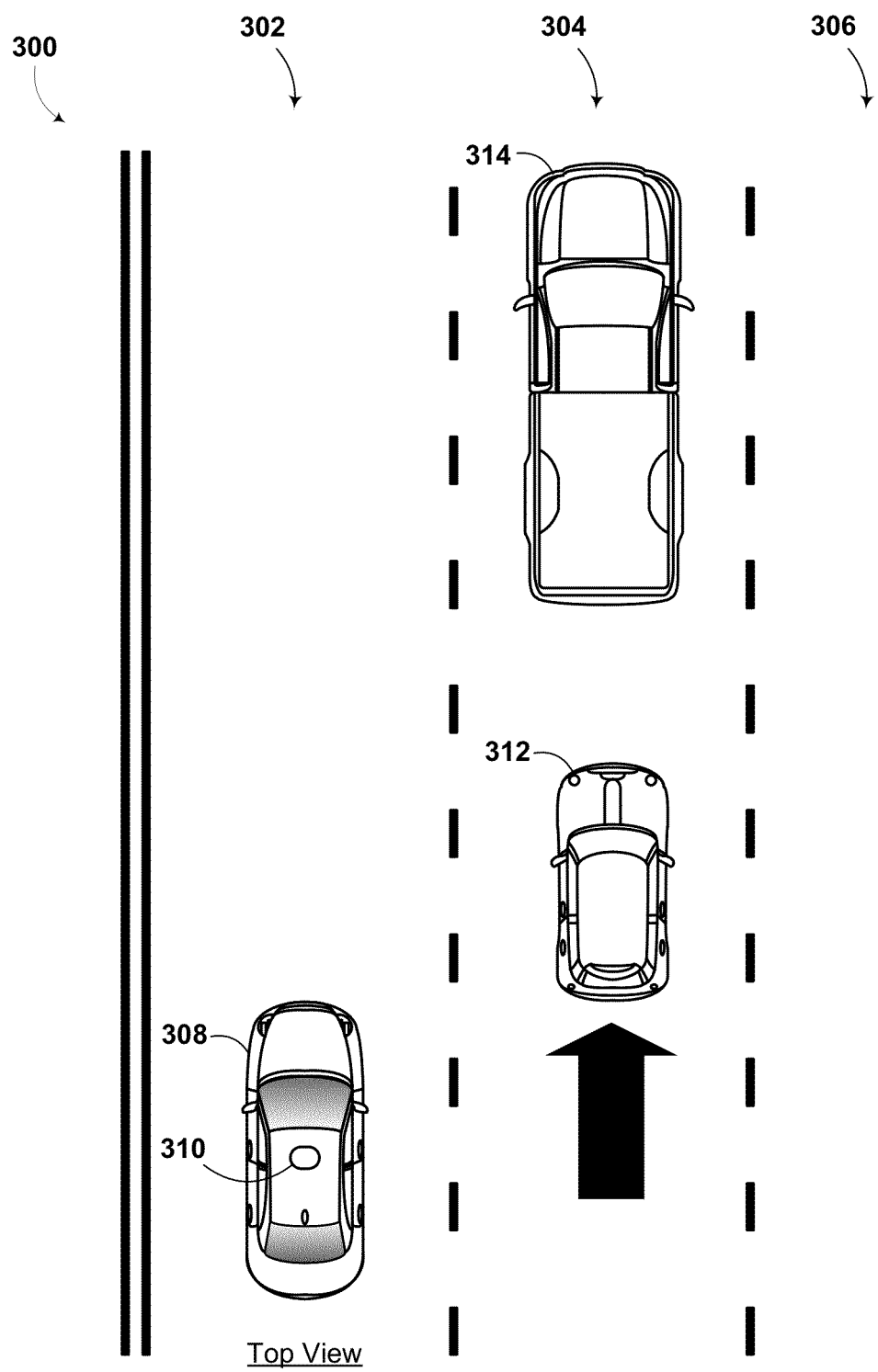
FIG. 3A is a top view of an autonomous vehicle operating scenario, according to an example embodiment.

FIG. 3A illustrates a scenario 300 involving a roadway with a left-most lane 302, a center lane 304, and a right-most lane 306. A truck 314 could be in the center lane 304. A vehicle 308 could be operating in an autonomous mode in the left-most lane 302. The vehicle 308 and the truck 314 could be travelling at the same speed. Another vehicle 312 could be in the center lane 304 and approaching the truck 314 from behind at a higher rate of speed. The sensor unit 310 of the vehicle 308 could be capturing sensor data based on an environment of the vehicle 308. In particular, a camera could capture a plurality of images of the truck 314, the other vehicle 312, as well as other features in the environment so as to help the computer system of the vehicle 308 to determine the current state of the environment of the vehicle 308. Other sensors associated with the vehicle 308 could be operable to provide the speed, heading, location, and other data such that the computer system of the vehicle 308 could determine the current state of the vehicle 308.

Based upon the current state of the vehicle 308 and the current state of the environment of the vehicle 308, the computer system in vehicle 308 could further determine a predicted behavior of at least one other vehicle in the environment of the vehicle 308. Within the context of FIG. 3A, predicted behaviors may be determined for both truck 314 and the other vehicle 312. As the predicted behaviors could be based on the current state of the environment of the vehicle 308, the computer system of the vehicle 308 could take into account factors such as the speed of the respective vehicles, their headings, the roadway speed limit, and other available lanes, among other factors. For instance, the truck 314 could have a predicted behavior of proceeding at the same speed, and within the same lane. Depending on the embodiment, such a predicted behavior that maintains a 'status quo' may be considered a default predicted behavior. Predicted behaviors for the other vehicle 312 could include the other vehicle 312 slowing down to match the speed of the truck 314. Alternatively, the other vehicle 312 could change lanes to the rightmost lane 306 or the other vehicle 312 could change lanes to the left-most lane 302 and cut off the vehicle 308.

Depending upon the embodiment and the situation, a wide variety of predicted behaviors of other vehicles could be possible. Possible predicted behaviors could include, but are not limited to, other vehicles changing lanes, accelerating, decelerating, changing heading, or exiting the roadway. Predicted behaviors could also include other vehicles pulling over due to an emergency situation, a vehicle colliding with an obstacle, and a vehicle colliding with another vehicle. Predicted behaviors could be based on what another vehicle may do in response to the vehicle 308 or in response to a third vehicle. Other predicted behaviors could be determined that relate to any vehicle driving behavior observable and/or predictable based on the methods and apparatus disclosed herein.

For each predicted behavior or for a predetermined set of predicted behaviors, the computer system of vehicle 308 could determine corresponding confidence levels. The confidence levels could be determined based on the likelihood that the given vehicle will perform the given predicted behavior. For instance, if the truck 314 is highly likely to perform the predicted behavior (staying in the current lane, maintaining current speed), the corresponding confidence level could be determined to be high (e.g., 90%). In some embodiments, the confidence level could be represented as a number, a percentage, or in some other form.

With respect to the other vehicle 312, possible confidence levels could be expressed as follows: slowing down to match speed of truck 314—40%, maintaining speed and changing to right-most lane 306—40%, maintaining speed and changing to left-most lane 302—20%.

The computer system could control vehicle 308 in the autonomous mode based on at least the determined predicted behaviors and confidence levels. For instance, the computer system could take into account the fact the truck 314 is highly unlikely to change its rate of speed or lane and as such, the computer system could consider truck 314 as a 'moving obstacle' that limits the drivable portion of the roadway for both the vehicle 308 as well as the other vehicle 312. The computer system may further consider that there is some finite probability that the other vehicle 312 will pull into the left-most lane 302 and cut off the vehicle 308. As such, the computer system may cause the vehicle 308 to slow down slightly, for instance by reducing the throttle, so as to allow a margin of safety if the other vehicle 312 elects to cut in front.

Figure 3B:
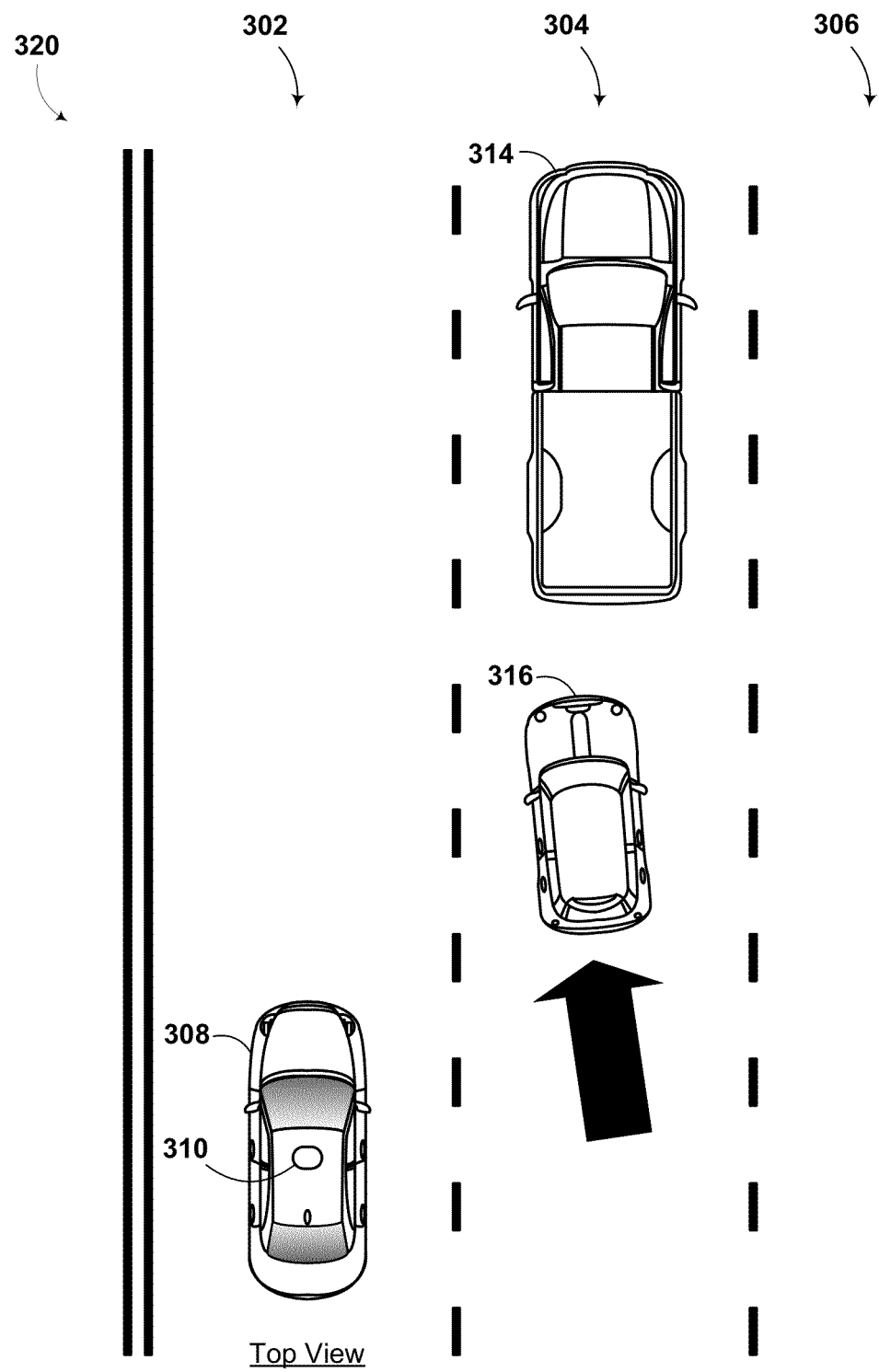
FIG. 3B is a top view of an autonomous vehicle operating scenario, according to an example embodiment.

FIG. 3B illustrates a scenario 320 similar to that in FIG. 3A but later in time. In scenario 320, the other vehicle 316 has changed its heading towards the left-most lane 302 and has moved closer to the truck 314. The computer system of vehicle 308 may continuously update the state of the vehicle 308 as well as its environment, for instance at a rate of thirty times per second. Accordingly, the computer system may be dynamically determining predicted behaviors and their corresponding confidence levels for vehicles in the environment of vehicle 308. In scenario 320, due at least in part to the changing environment, a new predicted behavior could be determined for truck 314. In such a situation, the truck 314 may make way for the other vehicle 316 by changing to the right-most lane 306. Thus, the predicted behaviors and corresponding confidence levels could change dynamically.

In scenario 320, the computer system of vehicle 308 could update the confidence level of the predicted behavior of the other vehicle 316. For instance, since the other vehicle 316 has changed its heading toward the left-most lane 302 and has moved nearer to the truck 314, it may be determined that the other vehicle 316 is highly likely to change lanes into the left-most lane 302. Accordingly, based on the increased confidence level of the predicted behavior of the other vehicle 316, the computer system of the vehicle 308 could control the brake unit to abruptly slow the vehicle 308 so as to avoid a collision with the other vehicle 316. As such, the computer system of vehicle 308 could carry out a range of different control actions in response to varying predicted behaviors and their confidence levels. For example, if another vehicle is predicted to behave very dangerously and such predicted behavior has a high confidence level, the computer system of vehicle 308 could react by aggressively applying the brakes or steering the vehicle 308 evasively to avoid a collision. Conversely, if the computer system determines that the other vehicle may carry out a predicted behavior that is very dangerous, but the confidence level is very low, the computer system may determine that only a minor adjustment in speed is necessary or the computer system may determine that no adjustment is required.

Figure 3C:
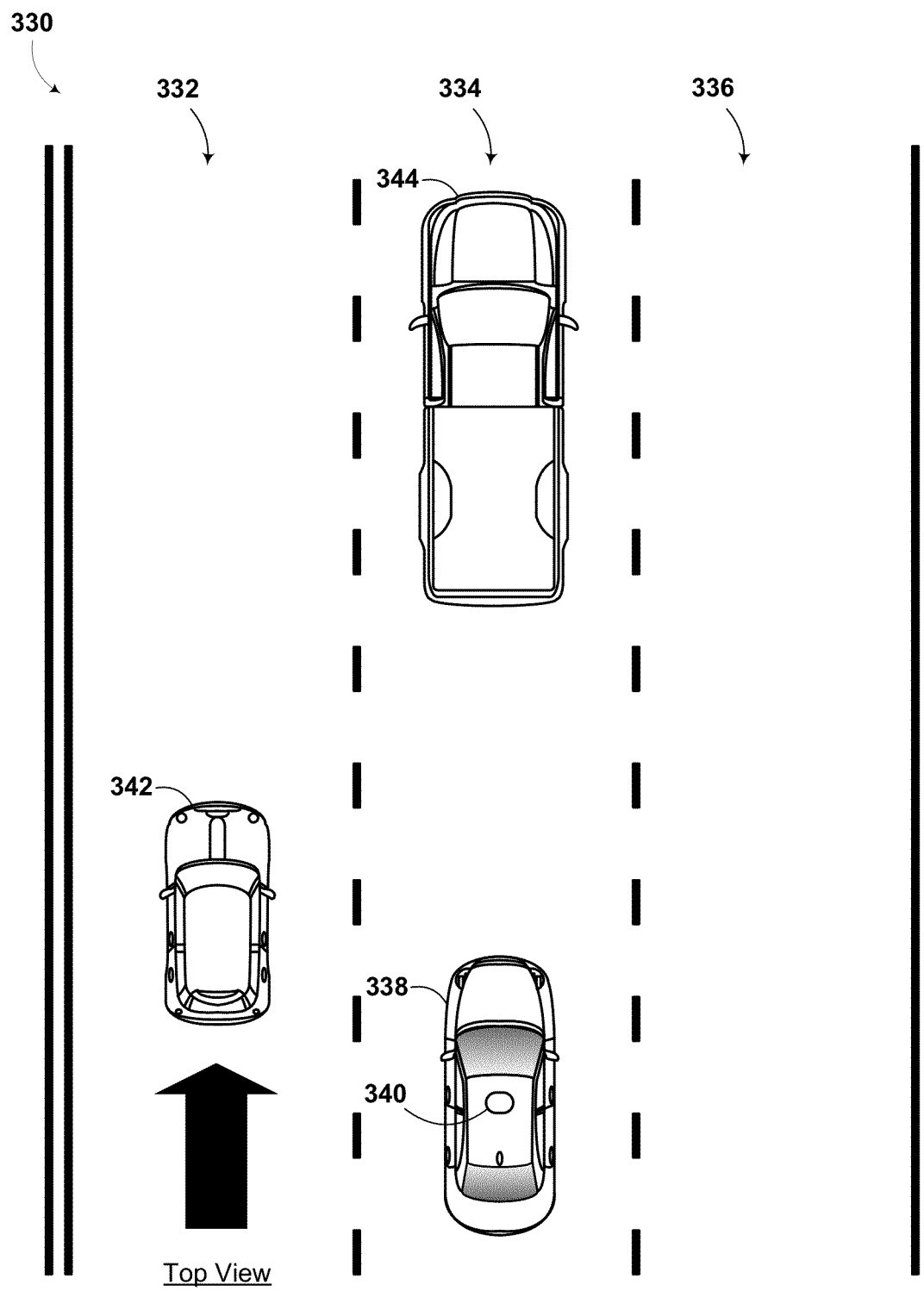
FIG. 3C is a top view of an autonomous vehicle operating scenario, according to an example embodiment.

FIG. 3C is a top view of an autonomous vehicle operating scenario 330. In scenario 330, a vehicle 338 with a sensor unit 340 could be operating in an autonomous mode. As such, the sensor unit 340 could be obtaining data from the environment of the vehicle 338 and the computer system of the vehicle 338 could be determining a current state of the vehicle 338 and a current state of the environment of the vehicle 338.

Scenario 330 includes a truck 344 traveling at the same speed and in the same center lane 334 as the vehicle 338. Another vehicle 342 could be traveling at a higher speed in the left-most lane 332. In such a situation, the computer system of vehicle 338 could determine predicted behaviors for the other vehicle 342 and the truck 344. The other vehicle 342 could continue at its current speed and within its current lane. Thus, a 'default' predicted behavior could be determined. For another possible predicted behavior, the other vehicle 342 may also change lanes into the center lane 334 and cut off the vehicle 338. The computer system of vehicle 338 could determine a default predicted behavior for the truck 344 (e.g., the truck 344 will maintain present speed and driving lane).

The computer system of vehicle 338 could determine confidence levels for each predicted behavior. For instance, the confidence level for the truck 344 maintaining speed and the same lane could be relatively high. The confidence level of the other vehicle 342 to change lanes into the center lane 334 and cut off the vehicle 338 could be determined to be relatively low, for instance, because the space between the truck 344 and the vehicle 338 is too small to safely execute a lane change. Further, the confidence level of the other vehicle 344 maintaining its speed and its current lane may be determined to be relatively high, at least in part because the left-lane 332 is clear ahead. Thus, based on these predictions and confidence levels, the computer system of vehicle 338 could control the vehicle 338 to maintain its current speed and heading in center lane 334.

3. Example Methods

Figure 4:
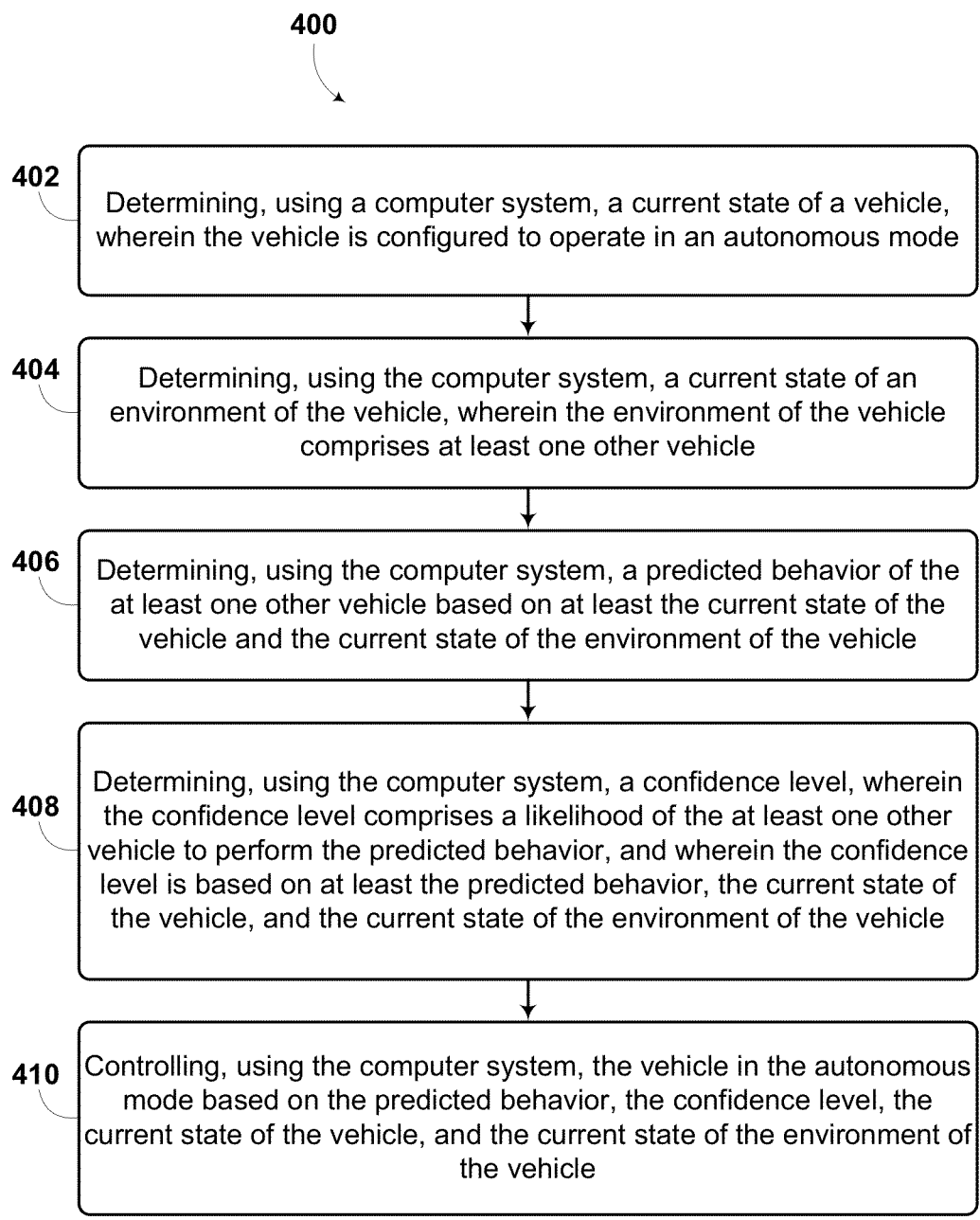
FIG. 4 shows a method, according to an example embodiment.

A method 400 is provided for determining information about a current state of a vehicle and its environment that includes at least one other vehicle, determining a predicted behavior of the other vehicle, determining a confidence level of the other vehicle to carry out the predicted behavior, and controlling the vehicle based on the determined information. The method could be performed using any of the apparatus shown in FIGS. 1 and 2 and described above, however, other configurations could be used. FIG. 4 illustrates the steps in an example method, however, it is understood that in other embodiments, the steps may appear in different order and steps could be added or subtracted.

Step 402 includes determining, using a computer system, a current state of a vehicle. The vehicle is configured to operate in an autonomous mode. The vehicle described in this method could be the vehicle 100 and/or vehicle 200 as illustrated and described in reference to FIGS. 1 and 2, respectively. Determining the current state of the vehicle could represent using various sensors to monitor one or more operational aspects of the vehicle. For example, the current state of the vehicle could be determined by acquiring information about any combination of the current speed, current heading, current driving lane, engine revolutions per minute, current gear, current position, etc. The information could be determined by the computer system of the vehicle or any other computing device associated with the vehicle. Depending upon the embodiment, the determination may be made fully or in part by a server network and communicated to the vehicle.

Step 404 includes determining, using the computer system, a current state of an environment of the vehicle. The environment includes at least one other vehicle. The other vehicle could be an automobile, a truck, a motorcycle, or some other type of vehicle. The vehicle could determine the current state of the environment by obtaining sensor data relating to the speed, position, heading, and current lane of other vehicles, as well as obstacles, roadway boundaries, and roadway conditions. Other possibilities exist for data that could be used to determine the current state of the environment. The determination could be made by the computer system of the vehicle or any other computing device associated with the vehicle. In another embodiment, the determination could be made by the server network and transmitted to the vehicle.

Step 406 includes determining, using the computer system, a predicted behavior of at least one other vehicle based on at least the current state of the vehicle and the current state of the environment of the vehicle. Possible predicted behaviors could include the at least one other vehicle performing any of a range of behaviors associated with driving on or off a roadway. For example, predicted behaviors could include continuing to drive at a particular speed, with a particular heading, and within a particular lane. Other predicted behaviors could include the at least one other vehicle changing speeds, changing lanes, or changing heading. Yet other predicted behaviors could include the other vehicle executing evasive manoeuvers, leaving the roadway, or even colliding with an obstacle or another vehicle. Many other predicted behaviors are possible within the scope of this disclosure and related to autonomous vehicles. The determination could be performed by the computer system of the vehicle or any other computing device located internal or external to the vehicle. The predicted behaviors could be determined by obtaining a match or near match between the current state of the vehicle and its environment and predetermined scenarios (e.g., certain arrangements of other vehicles, their respective speeds, respective lanes, and roadway boundaries) that may be likely to result in a given predicted behavior. Other ways of determining predicted behaviors are possible.

In an example embodiment, a server network could include a database that may include a plurality of predetermined scenarios. One or more predicted behaviors could be associated with each predetermined scenario. The vehicle could be transmitting sensor data or other data to the server regarding the current state of the vehicle and the vehicle's environment. Based on the data, the server network could determine that match exists between the current state of the vehicle and its environment and a predetermined scenario. In response, the server could transmit the predicted behaviors to the vehicle.

For instance, in reference to FIG. 3C, the vehicle 338 could transmit data regarding the current state of the vehicle 338 as well as the current state of the environment of vehicle 338 to a server network. Based on the data, the server network could determine a match between the current vehicle and environment data and a predetermined scenario. If a match is determined, any corresponding predicted behaviors could be transmitted to the vehicle 338.

In other embodiments, the vehicle may determine the predicted behaviors. For example, the vehicle may store a set of predetermined scenarios in memory or data storage. The predetermined scenarios may include associated predicted behaviors for other vehicles in the environment of the predetermined scenario. When the vehicle determines that there is a substantial match between its current operating state, the current state of the environment, and the predetermined scenario, the associated predicted behaviors could be determined.

Optionally, the vehicle and/or the server network may dynamically adjust their respective data stores of predetermined scenarios and predicted behaviors based on real-world experiences. For instance, a set of predicted behaviors associated with any predetermined scenario could change over time if the vehicle and/or the server network determine(s) a more appropriate set of predicted behaviors. In such a way, the vehicle and/or the server network could use machine learning or other techniques to adjust its response to real-world operating conditions.

Step 408 includes determining, using the computer system, a confidence level. The confidence level includes a likelihood of the at least one other vehicle to perform the predicted behavior. The confidence level is based on at least the predicted behavior, the current state of the vehicle, and the current state of the environment of the vehicle. The confidence level could be associated to one or more predicted behaviors and may be based on the probability for the one or more predicted behaviors to occur.

In some embodiments, the confidence level could represent the likelihood of a predicted behavior that may cause the vehicle to take action to avoid a collision. For example, in reference to FIG. 3A, the vehicle 308 could be driving in the left-most lane 302. Predicted behaviors that may cause the vehicle 308 to take action to avoid collision may include behaviors such as the truck 314 changing to the left-most lane 302 as well as the other vehicle 312 changing to the left-most lane 302. In such an example, one possible confidence level could represent a combination of the likelihoods that either or both of the aforementioned behaviors may occur. Other predicted behaviors and associated confidence levels are possible.

The confidence level could be calculated based on a combination of the discrete probabilities of the predicted behaviors. The confidence level could alternatively be calculated based on a discrete or continuous probability distribution based on predetermined likelihoods of the occurrence of the given predicted behaviors.

The confidence level could represent a static (unchanging) probability of an occurrence of the given predicted behavior. Alternatively, the confidence level could be adjusted based on, for instance, using sensor data in a machine learning algorithm. Thus, the confidence level could be calculated dynamically based on real-world operating conditions and operating experiences.

In other examples, each predicted behavior could have a determined confidence level. In such cases, the determined confidence levels could be related to the likelihood of the given predicted behavior.

The confidence level could be determined by the computer system of the vehicle or any other computing device. For example, as described above, the vehicle could store (e.g., in data storage) a plurality of predetermined scenarios. Based on sensor data and/or by other means, the vehicle could determine a match between one of the predetermined scenarios and the current state of the vehicle and the current state of the environment of the vehicle. The predetermined scenario may include one or more predicted behaviors as well as a corresponding statistical probability of an occurrence of each predicted behavior. Thus, a confidence level could be determined by the vehicle.

In some embodiments, a server network could, in part or in full, perform the determination of the confidence level. For example, as described above, the server network could store a plurality of predetermined scenarios. Each predetermined scenario could include one or more predicted behaviors. Further, each predicted behavior could have an associated likelihood. The likelihood may include a probability that the predicted behavior will occur based on, for instance, previous data. Thus, if a server network determines a substantial match between the current state of the vehicle, the current state of the vehicle environment, and a predetermined scenario, a corresponding set of predicted behaviors could be transmitted to the vehicle. Additionally, the likelihood of each predicted behavior could be transmitted to the vehicle. In such a fashion, the confidence level could be determined by the server network. Other ways of determining a confidence level are possible.

Step 410 includes controlling, using the computer system, the vehicle in the autonomous mode based on the predicted behavior, the confidence level, the current state of the vehicle, and the current state of the environment of the vehicle. In other words, the computer system may control the vehicle to act in response to the determined information from the foregoing steps of the disclosed method. In some instances, the computer system may cause the vehicle to adjust nothing. For instance, in a highway driving situation, such as that illustrated in FIG. 3C, vehicle 338 may not need to slow down or change lanes. Because the vehicle 338 is not likely to face a situation in which it will need to change its driving condition, the computer system may control the vehicle 338 to continue at the same speed, within the same driving lane, and, for example, maintain the same following distance to truck 344.

In response to more hazardous situations, the computer system of vehicle 308 could cause the vehicle 308 to adjust various aspects of its operation. For example, as illustrated in FIG. 3B, the computer system could determine (based on determined current state of the vehicle, determined current state of the environment, a determined predicted behavior, and the determined corresponding confidence level) that the other vehicle 316 is likely to change lanes to the left-most lane 302, cutting off vehicle 308. In such a scenario 320, the computer system may cause the vehicle 308 to aggressively apply brakes to decelerate the vehicle 308 to avoid collision. Other actions could be caused by the computer system, such as instructing the vehicle 308 to provide a warning notification. The warning notification could include, by way of example, a horn signal or a flashing light signal. In other embodiments, the warning notification could be a vehicle-to-vehicle communication message, such as a DSRC message.

In yet other embodiments, the computer system may cause the vehicle 308 to reduce throttle to more slowly reduce speed or shift within its lane. In yet other embodiments, the computer system could cause the vehicle 308 to take evasive actions to avoid collision, such as changing lanes or even moving over the double striped lanes to the left. Depending upon the scenario, the computer system could cause the vehicle 308 to perform a variety of actions that are all contemplated within the context of the present disclosure.

Example methods, such as method 400 of FIG. 4, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
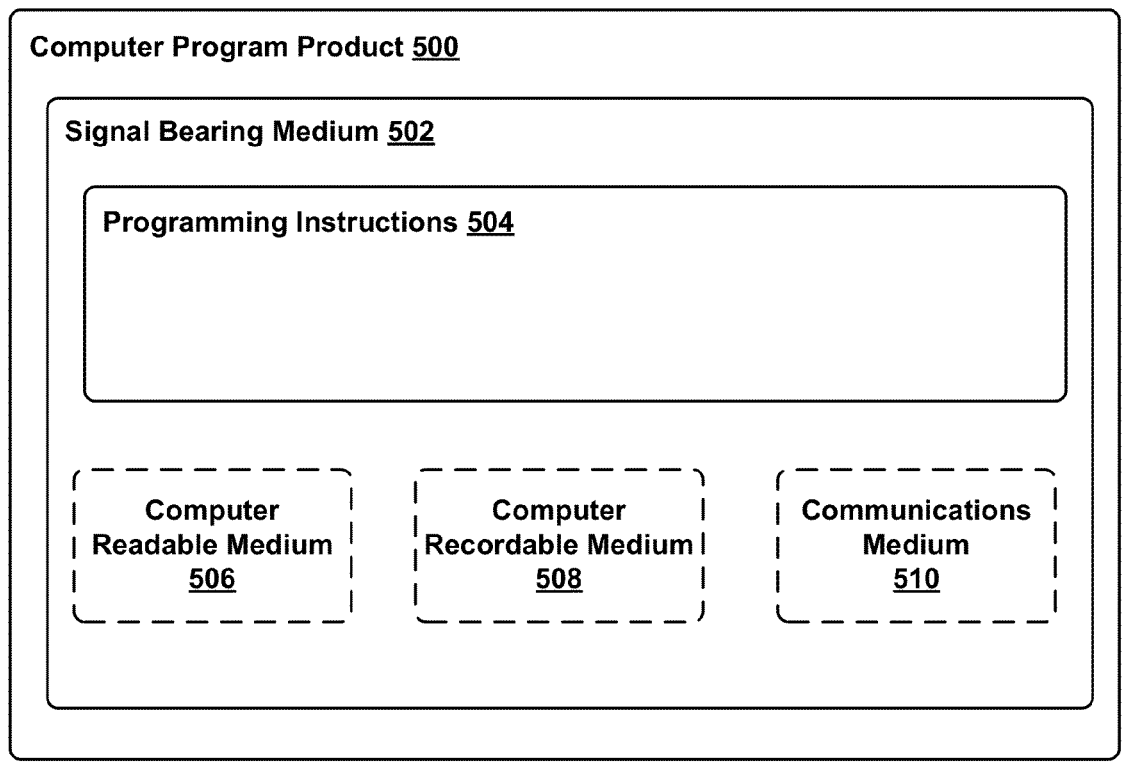
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method, comprising:
   determining, using a computer system, a current state of a vehicle, wherein the vehicle is configured to operate in an autonomous mode;
   determining, using the computer system, a current state of an environment of the vehicle, wherein the environment of the vehicle comprises a target vehicle;
   determining, using the computer system, at least one predicted behavior of the target vehicle based on at least the current state of the vehicle and the current state of the environment of the vehicle, wherein the at least one predicted behavior comprises the target vehicle changing lanes;
   determining, using the computer system, at least one confidence level, wherein the at least one confidence level represents a likelihood of the target vehicle performing the at least one predicted behavior, and wherein the at least one confidence level is based on the at least one predicted behavior, the current state of the vehicle, and the current state of the environment of the vehicle; and
   controlling, using the computer system, the vehicle in the autonomous mode based on the at least one predicted behavior, the at least one confidence level, the current state of the vehicle, and the current state of the environment of the vehicle.

2. The method of claim 1, wherein the vehicle is in a first lane, the target vehicle is in a second lane, and the at least one predicted behavior comprises the target vehicle changing lanes from the second lane to the first lane in front of the target vehicle.

3. The method of claim 2, wherein the current state of the vehicle comprises the vehicle being in the first lane.

4. The method of claim 3, wherein the current state of the environment of the vehicle comprises the target vehicle being in the second lane and the target vehicle overtaking the vehicle.

5. The method of claim 4, wherein the current state of the environment of the vehicle further comprises another vehicle being in the second lane ahead of the target vehicle.

6. The method of claim 2, wherein controlling the vehicle comprises controlling the vehicle to slow down.

7. The method of claim 1, wherein the at least one predicted behavior further comprises the target vehicle changing speed.

8. The method of claim 7, wherein the at least one confidence level comprises a confidence level for the predicted behavior of the target vehicle changing lanes and a confidence level for the predicted behavior of the target vehicle changing speed.

9. The method of claim 1, wherein determining the current state of the vehicle comprises determining at least one of a speed of the vehicle, a heading of the vehicle, or a position of the vehicle.

10. The method of claim 1, wherein determining the current state of the environment of the vehicle comprises determining at least one of a speed of the target vehicle, a heading of the target vehicle, a position of the target vehicle, a speed limit, or a number of available lanes.

11. The method of claim 1, wherein controlling the vehicle comprises causing the vehicle to perform an action comprising at least one of accelerating, decelerating, changing heading, changing lanes, shifting within a current lane, or providing a warning notification.

12. A vehicle, comprising:
   at least one sensor, wherein the at least one sensor is configured to acquire vehicle state information and environment state information, wherein the environment of the vehicle comprises a target vehicle; and
   a computer system configured to:
      determine a current state of the vehicle based on the vehicle state information;
      determine a current state of the environment of the vehicle based on the environment state information;
      determine at least one predicted behavior of the target vehicle based on at least the current state of the vehicle and the current state of the environment of the vehicle, wherein the predicted behavior comprises the target vehicle changing lanes;
      determine at least one confidence level, wherein the at least one confidence level represents a likelihood of the target vehicle performing the at least one predicted behavior, and wherein the at least one confidence level is based on the at least one predicted behavior, the current state of the vehicle, and the current state of the environment of the vehicle; and control the vehicle in the autonomous mode based on the at least one predicted behavior, the at least one confidence level, the current state of the vehicle, and the current state of the environment of the vehicle.

13. The vehicle of claim 12, wherein the at least one sensor comprises at least one of a camera, a RADAR system, a LIDAR system, a global positioning system, and an inertial measurement unit.

14. The vehicle of claim 12, wherein the computer system is configured to determine the current state of the vehicle based on at least one of a speed of the vehicle, a heading of the vehicle, or a position of the vehicle.

15. The vehicle of claim 12, wherein the computer system is configured to determine the current state of the environment of the vehicle based on at least one of a speed of the target vehicle, a heading of the target vehicle, a position of the target vehicle, a speed limit, or a number of available lanes.

16. The vehicle of claim 12, wherein the computer system is configured to control the vehicle to cause the vehicle to perform an action comprising at least one of accelerating, decelerating, changing heading, changing lanes, shifting within a current lane, or providing a warning notification.

17. A non-transitory computer readable medium having stored therein instructions executable by a computer system to cause the computer system to perform functions comprising:

determining a current state of a vehicle, wherein the vehicle is configured to operate in an autonomous mode;

determining a current state of an environment of the vehicle, wherein the environment of the vehicle comprises a target vehicle;

determining at least one predicted behavior of the target vehicle based on at least the current state of the vehicle and the current state of the environment of the vehicle, wherein the at least one predicted behavior comprises the target vehicle changing lanes;

determining at least one confidence level, wherein the at least one confidence level represents a likelihood of the target vehicle performing the at least one predicted behavior, and wherein the at least one confidence level is based on the at least one predicted behavior, the current state of the vehicle, and the current state of the environment of the vehicle; and controlling, using the computer system, the vehicle in the autonomous mode based on the at least one predicted behavior, the at least one confidence level, the current state of the vehicle, and the current state of the environment of the vehicle.

18. The non-transitory computer readable medium of claim 17, wherein determining the current state of the vehicle comprises determining at least one of a speed of the vehicle, a heading of the vehicle, or a position of the vehicle.

19. The non-transitory computer readable medium of claim 17, wherein determining the current state of the environment of the vehicle comprises determining at least one of a speed of the target vehicle, a heading of the target vehicle, a position of the target vehicle, a speed limit, or a number of available lanes.

20. The non-transitory computer readable medium of claim 17, wherein controlling the vehicle comprises causing the vehicle to perform an action comprising at least one of accelerating, decelerating, changing heading, changing lanes, shifting within a current lane, or providing a warning notification.

\* \* \* \* \*